Oct. 28, 1924.
W. R. McGOWEN
AUTOMOBILE BUMPER
Filed Nov. 9, 1923
Fig.1
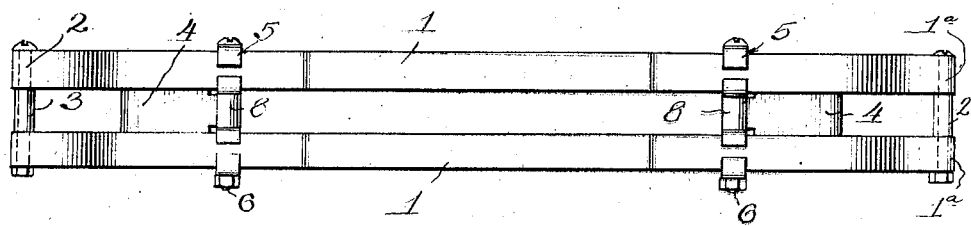
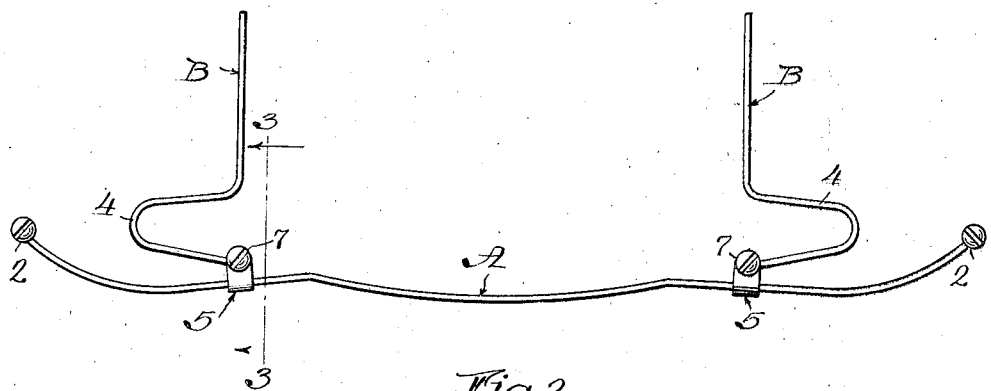
Fig.2
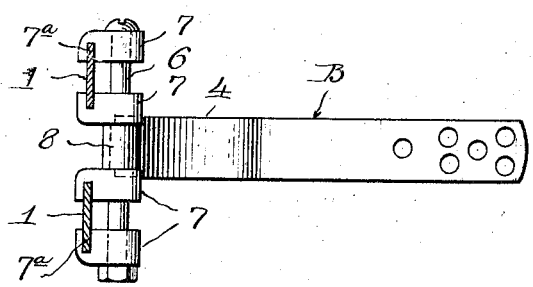
Fig.3
Witness:
Chas. R. Koursh
Inventor,
William R. McGowen, Patented Oct. 28, 1924.

1,513,256

UNITED STATES PATENT OFFICE.

WILLIAM R. McGOWEN, OF CHICAGO, ILLINOIS.

AUTOMOBILE BUMPER.

Application filed November 9, 1923. Serial No. 673,638.

*To all whom it may concern:*

Be it known that I, WILLIAM R. Mc-GOWEN, a citizen of the United States, and a resident of Chicago, in the county of Cook and State of Illinois, have invented certain new and useful Improvements in Automobile Bumpers, of which the following is a specification.

This invention relates to improvements in automobile bumpers, more particularly to bumpers constructed almost entirely of resilient bars so designed that the force of impacts, resulting from collisions, is resisted or absorbed by the yielding or spring action of the bars.

The object of the invention is to provide a substantial construction for a bumper embodying certain novel features of design which will enable manufacturers to provide a practical yet inexpensive protective device for automobiles.

A further object of the invention is to embody in a bumper of the general character described an effective method of attaching the bumper to the automobile through the medium of resilient bars so shaped as to aid in resisting the force of impact, and so connected with the bumper proper as to permit of the necessary distortion without subjecting the structure to strains which would otherwise be detrimental thereto.

A bumper embodying the features alluded to is disclosed in the accompanying drawings in which—

Figure 1 is a view in front elevation of a preferred form of bumper embodying the invention;

Figure 2 is a top plan view of the bumper and

Figure 3 is an enlarged detailed view in vertical section taken on line 3—3 of Figure 2.

The bumper consists generally of an impact member A adapted to extend transversely at the front or rear of an automobile, and two arms or attaching members B, B, extending generally at right angles with the impact member A and connected at their forward ends through the medium of a pivotal swivel connection with the impact member at points inwardly from the extremities thereof, and to be clamped or otherwise attached at their opposite or free end portion to the side frame members of the automobile.

Referring more in detail, to the structure of the impact member A, the same consists of two bars 1, 1, extending in parallel or vertical spaced relation throughout the length of the impact member and connected at their ends as well as at points disposed inwardly therefrom by members hereinafter to be described. These bars 1, 1, are preferably flat and made of a suitable grade of spring steel, their faces being arranged in a vertical plane so that the bars are yieldable in a horizontal direction and relatively non-yieldable in a vertical direction. Moreover, as clearly shown in Figure 2, the bars are bent or shaped so that their end portions have a slight rearward curvature or inclination and the central portion intermediate the points of connection with the arms B, B, has a slight forward bow. This treatment of the bars is resorted to, for the purpose of giving the bumper a more graceful and attractive appearance, as well as increasing somewhat the stiffness or resistance against distortion under impact.

As a means for joining or connecting the bars 1, 1 together at their ends to form a rigid structure, there are eyes $1^a$ formed at the ends of each bar and through which extend relatively long bolts 2, 2. Bushings or spacing sleeves 3, 3 are mounted on the portions of the bolts between the bars 1, 1 and serve to space the bars apart.

The arms or attaching bars B, B are preferably secured to the impact member at points disposed inwardly from the extremities thereof, and extend generally at right angles thereto, although the portions immediately adjacent the impact member are bent or shaped to form U-shaped loops 4, 4, extending laterally and substantially parallel with the impact member connecting the ends of the attaching arms B, B. With the impact member are clamping members 5, 5 consisting of parts as follows: Bolts 6, 6, similar in all respects to the bolts 2, 2, connecting the ends of the bars 1, 1 extend vertically at the rear of the bars 1, 1, each bolt carrying a pair of clamping blocks 7, 7, which extend forwardly and engage the edges of the bars 1, 1, by means of slots or recesses $7^a$ formed in their opposed faces. The pairs of clamping blocks are spaced apart thus leaving the central portion of each bolt 6 exposed, this portion serving as a journal or swivel bearing for the ends of each attaching arm B, which has formed at its end an eye 8, which surrounds the central portion of the bolt and forms the hinged or pivotal connection, permitting a relative rotative movement about the axis of the bolt. Thus, if the central portion of the impact member strikes, or is struck, by an obstacle, this portion of the impact member will be displaced rearwardly, whereas the end portions will be thrown forwardly, the clamping members 5, 5, and particularly the bolt and eye connection, forming the pivot or axis of this movement. In this manner the bar is free to undergo the distortion incident to the resistance of the impact without the danger of permanently distorting the bars 1, 1, by reason of any rigid or fixed points of support. Moreover, a blow delivered against the impact member will have a portion of its force transmitted to the attaching arms B, B, which, by reason of the presence of the resilient U-shaped portions 4, 4, will absorb a part of the force as these U-shaped portions undergo contraction. This is particularly true in case the point of impact is coincident with the point of connection between the impact member and either of the attaching bars B, B. Thus it is seen that the provision of attaching bars, so shaped as to provide yieldable spring elements, greatly simplifies the construction of the bumper in that it eliminates the requirement of an additional rearwardly disposed reinforcing bar, such as is ordinarily interposed between an impact member and the attaching members. Furthermore, the parts of the bumper are, for the most part, of standard design and therefore can be readily procured from machine shops and hardware stores, thus making it an easy matter to make replacements in case of breakage. In short, the entire bumper is designed with a view of providing an inexpensive article, without sacrificing its appearance or protective qualities.

Having described the device embodied in this invention, I claim:

1. A bumper comprising an impact member consisting of resilient bars spaced apart vertically, bars extending transversely from said impact member for attachment to an automobile, and provided with U-shaped loop intermediate their ends, and intermediate connecting members comprising bolts extending transversely of said impact member and blocks carried on said bolts and engaging the edges of said bars, said attaching bars having hinged connection with said impact member through the medium of looped ends engaging said bolts intermediate said bars.

2. A bumper comprising an impact member consisting of resilient bars extending in vertically spaced relation throughout the length thereof, attaching members extending transversely from said impact member for attachment to an automobile and comprising resilient bars provided with laterally extending U-shape loops adjacent said impact member, and intermediate connecting members comprising bolts extending vertically adjacent said impact member, clamping blocks mounted on each of said bolts and engaging the bars of said impact member therebetween, the free ends of said loop portions being bent around the central portion of said bolts and forming a pivotal connection therebetween.

In witness whereof, I hereunto subscribe my name this 1st day of November, A. D., 1923.

WILLIAM R. McGOWEN.